Aug. 21, 1956 H. E. SHIGLEY ET AL 2,759,263
DEBURRING MEANS
Filed May 4, 1953
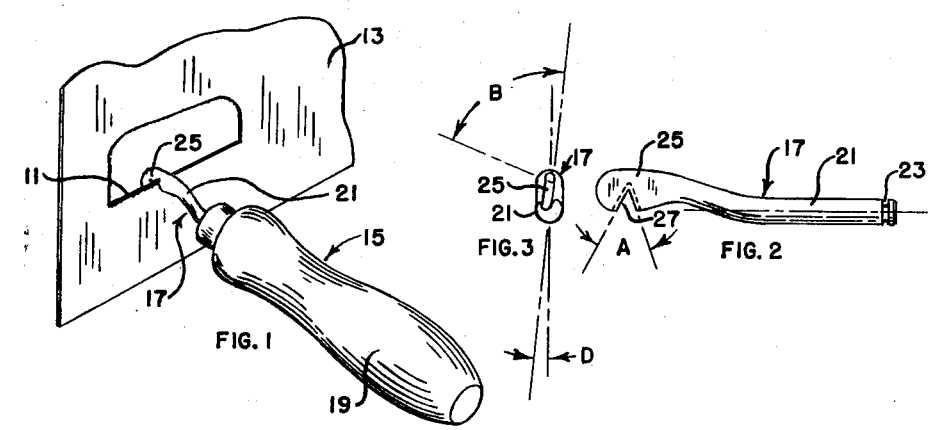
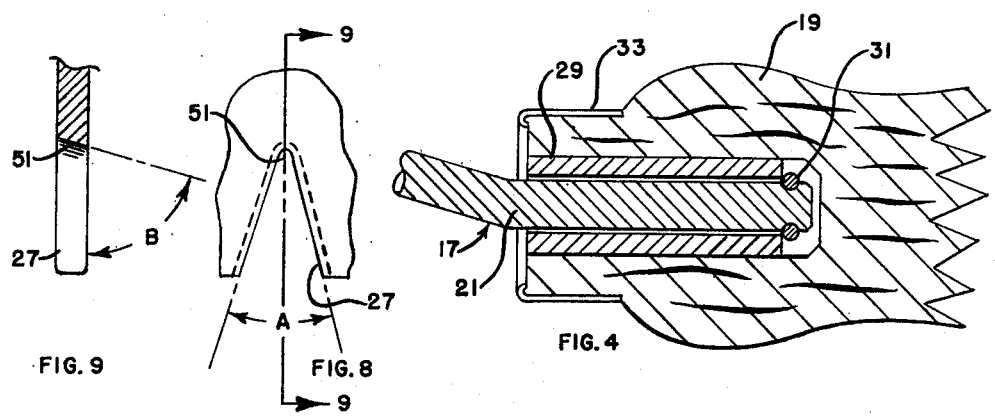
INVENTORS:
HAROLD E. SHIGLEY
ARCHIE J. FRAME
BY: John H. Widdowson
ATTORNEY United States Patent Office 2,759,263
Patented Aug. 21, 1956

2,759,263
DEBURRING MEANS
Harold E. Shigley and Archie J. Frame, Wichita, Kans.
Application May 4, 1953, Serial No. 352,808
2 Claims. (Cl. 30—317)

This invention relates to deburring or edge breaking. In a more specific aspect, this invention relates to new means for removing burrs from edges. In a still more specific aspect, this invention relates to deburring tools which are particularly advantageously used to deburr outside edges of panel members, and the like. In still another specific aspect, this invention relates to a new swivelled deburring tool which is particularly advantageously used to deburr the edge of regular or irregular shaped holes in panel members, and the like.

Deburring tools are known in the art, and it is known that burrs can be removed by filing same from the edges on which they occur. Filing to remove burrs is tedious, time-consuming, and nerve-racking to the worker. The deburring tools known in the art prior to the invention of our new deburring tool disclosed herein chatter in use, thus being nerve-racking to the user, are weak in structure, thus having short life and being unsafe to use, and tend to scrape or burnish rather than to remove the burrs by a cutting operation.

We have invented new deburring means which is very advantageous. The new deburring means of our invention has a shank member adapted in one end portion for holding same, the other end portion having a notch therein. It is preferable that the inner portion of the notch is curved, it being found that this makes our tool strong and long-lasting in use. The edge of said notch is beveled to form opposite acute cutting edges which contact the material to be deburred. The cutting edges of the deburring tools of our invention are preferably drawn over the outside edge of panels or members formed from sheet metal, or they are drawn over the edge of apertures, such as holes, grooves, slots, and the like, in such panels or members. The new deburring tools of our invention have many advantages. They do not chatter in use, and give a much cleaner deburred edge than tools known in the prior art. With our new swivel tools, circular or irregular shaped holes and other apertures in a panel member, etc., can be deburred without rotating the tool in the hand, the tool always being carried in a comfortable and convenient horizontal position. The new deburring tools of our invention eliminate hand filing to deburr panel structure, thus saving time, money and man power. Straight and irregular shaped outside edges can be quickly and easily deburred with the non-swivel deburring tools of our invention. The new tools of our invention are easy and economical to make and use, and are strong and long-lasting in use.

It is an object of this invention to provide new deburring means.

It is another object of this invention to provide new deburring tools which are strong, long-lasting and which do not chatter in use, thus not being nerve-racking to use.

It is still a further object of this invention to provide a new swivelled deburring tool which is particularly advantageously used to deburr the edges of holes, grooves, notches, or other apertures, in panels or members made from sheet metal, etc.

It is yet another object of our invention to provide new deburring tools which are particularly advantageously used to deburr straight or irregular shaped outside edges of panels or members formed from sheet metal, or the like.

Other objects and advantages of the deburring means of our invention will become apparent to one skilled in the art upon reading this disclosure.

Drawings accompany and are a part of this disclosure. It is to be understood that such drawings are not to unduly limit the scope of our invention. The drawings depict preferred specific embodiments of the new deburring tools of our invention, and in such, Fig. 1 is a perspective view of a swivelled deburring tool, showing the tool in operative position for deburring the edge of an aperture in a panel.

Fig. 2 is an elevation view of the operating portion and shank of the tool shown in Fig. 1.

Fig. 3 is a left end view of the tool member shown in Fig. 2.

Fig. 4 is a longitudinal cross sectional view showing a preferred specific means of mounting the tool and shank member shown in Figs. 1, 2 and 3 in the handle shown in Fig. 1.

Fig. 5 is an elevation view, partly in cross section, showing a preferred specific embodiment of the deburring tool of our invention particularly adapted for deburring the outside edge of a panel, with the tool in operative position for carrying on such an operation.

Fig. 6 is an elevation view of the operating portion and shank of the tool in Fig. 5.

Fig. 7 is a left end view of the tool member shown in Fig. 6.

Fig. 8 is an elevation view showing a preferred embodiment of the notch having cutting edges shown in the tools of Figs. 1, 2, 3, and 4 and Figs. 5, 6 and 7.

Fig. 9 is a view taken on line 9—9 of Fig. 8.

The following is a discussion and description of preferred specific embodiments of the new deburring tools of our invention. Such discussion and description is made with reference to the drawings on which the same reference numerals are used to depict like or similar structure. It is to be understood that the following discussion and description is not to unduly limit the scope of our invention.

Figs. 1, 2, 3 and 4 depict a preferred specific embodiment of the deburring means of our invention, and such means is shown in Fig. 1 in operative position to deburr edge 11 of panel member 13. The preferred embodiment, swivel tool 15, comprises elongated member 17 rotatably mounted in handle 19. Elongated member 17 has a shank on inner end portion 21 with a circumferential groove 23 therein and an outer preferably flat portion 25 having a notch 27 therein, the edges of notch 27 being beveled to form cutting edges at one outer surface of head 25. A sleeve 29 is mounted on shank 21 and held thereon in any suitable manner such as by snap ring 31 in groove 23. Sleeve 29 is mounted in handle 19 in any suitable manner, preferably by pressing same into a hole in handle 19 so that there is a tight press-fit. Ferrule 33 is desirably used around the inner end of handle 19 to add strength.

Figs. 5, 6 and 7 depict other preferred specific embodiments of the deburring means of our invention, showing such means in operative position to deburr the outer edge 35 of a panel 37. Tool 39 has an operating member 41 mounted in handle 43. Operating member 41 has a shank portion 45 and a preferably flattened end portion 47 with a notch 27 therein. The inner end of shank 45 is preferably pointed, and is mounted in handle 43 in any suitable manner, desirably by press-fit. Ferrule 49 is employed on the inner portion of handle 43 to give additional strength.

Notch 27 is desirably a V-shaped notch, as shown, having a size such that angle A is from 30° to 60°, preferably 45° to 55°. The edges of notch 27 are preferably beveled to form opposite cutting edges at the surfaces of members 25 and 47 which are toward the user of the tools, that is so that cutting of the burrs from the edges is accomplished by drawing the tool. If desired, the tool can be constructed with the cutting edge away from the user so that the tool is used to remove burrs by pushing it away from the user. The bevel to form the cutting edge is preferably such that angle B, the angle of bevel at the central point of the inner part of notch 27, is in the range of 30 to 80°, preferably 65° to 80°. The inner part 51 of notch 27 is preferably curved slightly which has been found to make the tools strong and long lasting. It is preferred that the inner part 51 be shaped on a radius of from $\frac{1}{128}$ to $\frac{1}{32}$ of an inch, more preferably $\frac{1}{96}$ to $\frac{1}{64}$ of an inch. Head 25 of tool member 17 is preferably twisted slightly, as shown. It is desirable that portion 25 be twisted so that angle D is in the range of 3° to 8°, more desirably in the range of 4° to 6°, angle D being an angle between either of the parallel planes of the faces of flat blade portion 25 and a plane tangent to the middle shank offset portion of the tool shaft. End portion 25 having notch 27 therein is offset from the end portion of shank 21 so that the cutting edge maintains the desired cutting angle in relation to the edge being deburred, preferably at least offset so that the point at which deburring takes place when the tool is in use is beyond the center line of the end portion of shank 21. We have found it desirable that the outer end of the angled portion of shank 21 be offset from ½ to 1½ shank thicknesses, more preferably from ¾ to 1¼ shank thicknesses. The head portion 47 of tool member 41 is bent at an angle from straight shank portion 45. It is preferred that head portion 47 be obtusely angled from shank portion 45 so that a plane parallel to the inner flat surface of head 47 is at an angle C of from 10° to 25° from a panel at right angles to the longitudinal axis of shank portion 45, more preferably at an angle of 15° to 20°. The tools of our invention made within the specifications set forth herein give excellent deburring results with a minimum of skill in use required by the user. Because of their particular structure, our tools provide for the cutting edge in use to be in proper position to the edge being deburred. Tool 15 automatically assumes proper deburring position in use when used to deburr either edges of apertures or outside edges of any shape.

We have found it desirable to make members 17 and 41 out of rod material which is flattened on the end thereof to form heads 25 and 47, respectively, the notches being placed therein by any suitable method, such as by filing or machining. Other methods of manufacture can be used as desired. Our tools can be used to deburr the edges of metal, plastic, etc. members and apertures therein. The cutting edges of the tools are desirably harder than the material to be deburred. We have found that the tools when made out of hardened steel are long-lasting when used to deburr material, such as aluminum, magnesium, copper, zinc, tin, alloys of same, and the like. Excellent results have been obtained on material of this nature of a thickness in the range of from 0.02 to 0.125 inch with tools in which angle A is 45° to 55° and angle B is 65° to 80°. We have found that tools having such sizes of angles give no chattering in use, thus allowing use for a long time without being nerve-racking to the user, give a smooth deburred edge, and are long-lasting. As the thickness of material increases, for example material from 0.0625 to 0.125 inch thick, angle B can be in the lower portion of the 65° to 80° range, preferably in the range of 65° to 70°. Our tool is desirably used to deburr members having a thickness of from 0.02 to 0.150, more preferably in the range of 0.02 to 0.125.

Tool 15 shown in the drawings is for right-handed use. A left-handed tool can be made by reversing the bevel of notch 27 and the twist of head 25. Tool 39 can be used by either right-handed or left-handed operators. Tool 15 can be used to deburr outside edges as well as inner edges as shown, being particularly valuable in deburring circular or irregular shaped holes in panel members. The tool is convenient to use, always being carried in a comfortable horizontal position. No part rotates in the hand of the user. Tool 39 is preferably used to deburr outside edges of panels, being drawn toward the user over the edge being deburred. If desired, tool 39 can be made with a straight shaft and end portion with notch 27 on the side thereof, that is a transverse slot rather than a longitudinal slot, so that edges can be deburred with a fixed handle tool in an operating position such as that used with tool 15. It has been found that such a non-swivelled side tool works well for outside edges and is less expensive to make than tool 15.

As will be evident to those skilled in the art, various modifications of this invention can be made, or followed in the light of this disclosure and discussion, without departing from the spirit or scope of the disclosure or from the scope of the claims.

We claim:

1. A deburring tool, comprising, in combination, a handle, a socket in one end of said handle, a shaft having a straight inner shank portion which is freely rotatably mounted in said socket, and means for retaining said straight portion of said shaft in said socket, a bend in said shaft adjacent said handle providing a middle shank portion of said shaft offset from what would be a straight extension of said shaft from said straight inner shank portion, the outer end portion of said shaft being flattened to form a flat blade portion which is twisted transversely and which has substantially parallel faces with the plane of either of said faces being at a slight angle to a plane tangent to said middle shank portion of said shaft, a V-shaped notch in said flat blade portion with the outer ends of the sides of said notch on the forward face of said flat blade portion being approximately on the center line extended of said straight portion of said shaft, said V-shaped notch having a rounded apex, the edges of said sides of said notch on said forward face being cutting edges with said cutting edges being beyond said center line extended of said straight portion of said shaft, and the edges of the sides of said notch defining on the face of said flat blade portion opposite said forward face a V-shaped notch having a larger area than the area on said forward face.

2. A deburring tool, comprising, in combination, a handle, a socket in one end of said handle, a shaft having a straight inner shank portion which is freely rotatably mounted in said socket, and means for retaining said straight portion of said shaft in said socket, a bend in said shaft adjacent said handle providing a middle shank portion of said shaft offset from what would be a straight extension of said shaft from said straight inner shank portion, the outer end portion of said shaft being flattened to form a flat blade portion which is twisted transversely and which has substantially parallel faces with the plane of either of said faces being at an acute angle of 4° to 6° to a plane tangent to said middle shank portion of said shaft, a V-shaped notch having flat sides in said flat blade portion with the outer ends of the sides of said notch on the forward face of said flat blade portion being approximately on the center line extended of said straight portion of said shaft, said V-shaped notch having a rounded apex of small radius, the edges of said sides of said notch on said forward face being cutting edges with said cutting edges being beyond said center line extended of said straight portion of said shaft, and the edges of the sides of said notch defining on the face of said flat blade portion opposite said forward face a V-shaped notch having a larger area than the area on said forward face.

References Cited in the file of this patent
UNITED STATES PATENTS

| Number | Name | Date |
|---|---|---|
| 847,321 | Date et al. | Mar. 19, 1907 |
| 1,775,813 | Colby | Sept. 16, 1930 |
| 1,842,903 | Falk | Jan. 26, 1932 |
| 2,359,607 | Bashara | Oct. 3, 1944 |
| 2,598,443 | Roth | May 27, 1952 |
| 2,646,621 | Catanese | July 28, 1953 |